July 15, 1941.  P. WEIEN  2,249,448
SWITCH-CONTROLLED VACUUM FLASHER
Filed Jan. 15, 1940
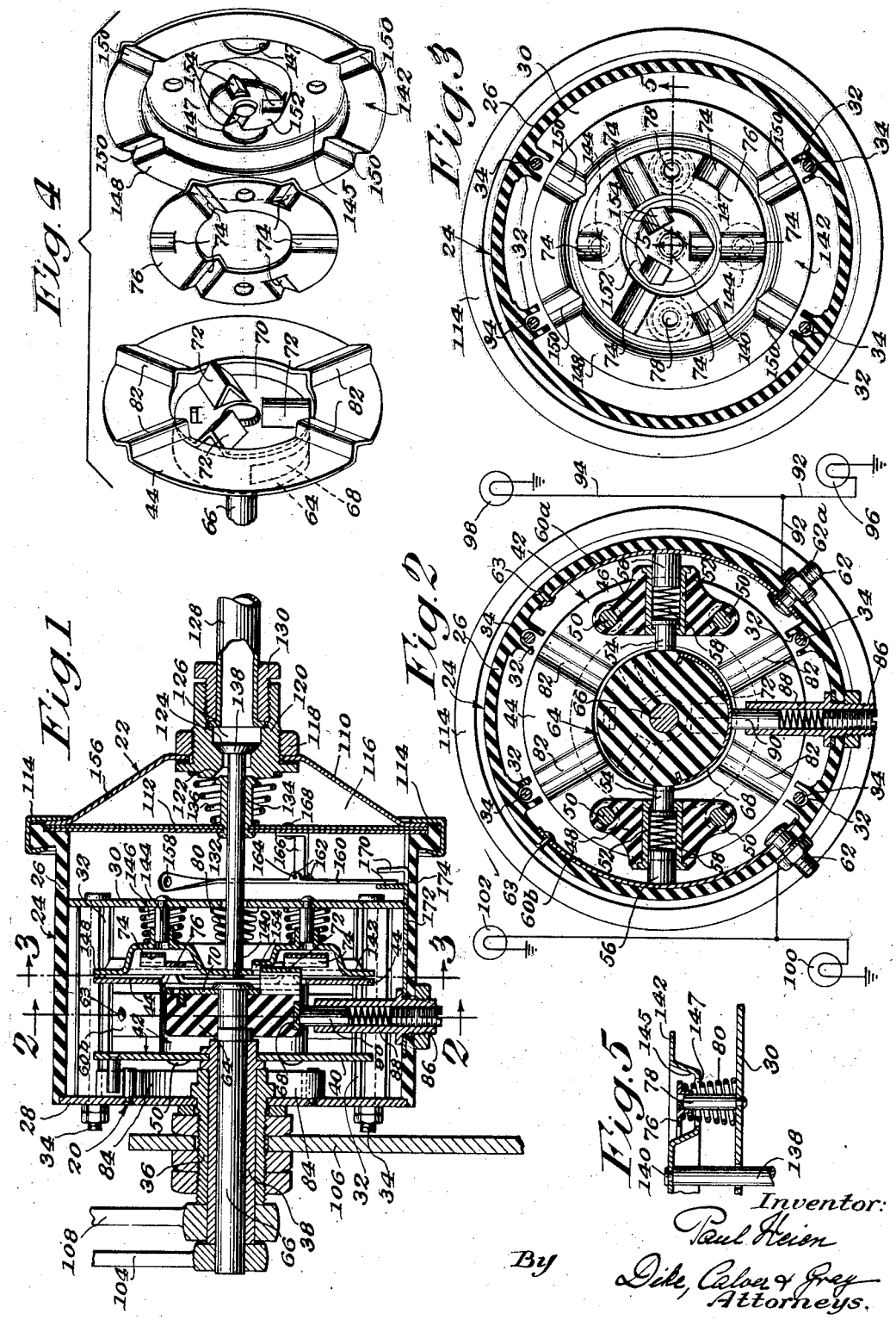
Inventor:
Paul Weien
By Dike, Calver & Gray
Attorneys.

Patented July 15, 1941

2,249,448

UNITED STATES PATENT OFFICE 2,249,448

SWITCH-CONTROLLED VACUUM FLASHER

Paul Weien, Marietta, Pa., assignor of one-half to Henry S. Rich, Jr., Marietta, Pa.

Application January 15, 1940, Serial No. 313,863

12 Claims. (Cl. 200—59)

This invention relates to direction indicator systems for automotive vehicles, and more particularly to an electric system whose direction signals are in the form of periodic light flashes at one or both ends of a vehicle and on either side of the same.

It is the primary aim and object of the present invention to provide a vacuum flasher which is in each signal circuit of an electric direction indicator system and is connected with, and disconnected from, an operating partial vacuum on closing and opening, respectively, any signal circuit or circuits by means of a control switch which is common to all signal circuits.

It is a further object of the present invention to embody the common control switch and the vacuum flasher in a single contained unit, thereby not only simplifying the control of the switch over the operation of the flasher but the installation of the entire indicator system as well.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawing:

Fig. 1 is a longitudinal section through a direction switch and vacuum flasher unit embodying the present invention.

Figs. 2 and 3 are cross-sections through the unit taken on the lines 2—2 and 3—3, respectively, of Fig. 1.

Fig. 4 shows several disassembled parts of the unit in perspective.

Fig. 5 is a fragmentary section taken on the line 5—5 of Fig. 3.

Referring to the drawing, Fig. 1 shows a direction signal switch 20 and a vacuum flasher 22 combined in a single contained unit. The switch 20 comprises a housing 24 consisting of a cylindrical cover 26 and two end covers 28 and 30. The cover 26 is provided with a plurality of longitudinal guide channels 32 (Fig. 2) which receive bolts 34 that retain the end covers 28 and 30 in engagement with the opposite ends of said guide channels. Suitably mounted on the end cover 28 is a bearing sleeve 36 (Fig. 1) in which is journalled an axially immovable bearing sleeve 38 that carries on its inner end in any suitable manner a disc 40 of a brush carrier 42 which includes another, centrally apertured disc 44 and two diametrically opposite brush holders 46 and 48 of any suitable insulating material such as "Bakelite" (Fig. 2). The discs 40, 44 and the brush holders 46, 48 therebetween are assembled together by rivets 50 or the like. Provided in the brush holders 46, 48 are conductive sleeves 52 each of which receives two brushes 54 and 56 and a spring 58 that urges said brushes apart. The outer brushes 56 in the conductive sleeves 52 of the brush holders 46 and 48 are urged into permanent engagement with arcuate conductive tracks 60a and 60b, respectively, which are secured to the inner cylindrical wall of the switch housing by means of terminals 62 and rivets 63. The inner brushes 54 in the sleeves 52 of the brush holders 46 and 48 ride on the periphery of a rotor 64 which is a disk of any suitable insulating material, suitably mounted on a stub shaft 66 which is journalled and suitably held against axial movement in the bearing sleeve 38 of the brush carrier. Suitably carried by the rotor 64 is an arcuate conductor 68 whose periphery is concentric to, and flush with, the periphery of said rotor. The rotor 64 is further provided with a metal disc 70 (Figs. 1 and 4), having preferably three equi-angularly spaced cams 72 which are adapted to register under certain conditions with depressions 74 in a metallic lock disk 76. The lock disk 76 is held non-rotatable and is guided for movement axially of the rotor 64 by means of guide pins 78 (Figs. 3 and 5) which project from the end cover 30 of the switch housing, and said lock disk is normally urged against the rotor disc 70 by compression springs 80 which surround the guide pins 78. The apertured disc 44 of the brush carrier is preferably provided with four cams 82 (see also Fig. 4) whose inner ends are adapted to register under certain conditions with the depressions 74 in the lock disk 76. The cams 72 and 82 on the rotor and the brush carrier, respectively, and the depressions 74 in the lock disc 76 are of a similar cross-sectional shape so that said depressions 74 may simultaneously register with the cams 72 and 82 when the rotor and the brush carrier assume certain angular positions. Thus, in the neutral position of the brush carrier 42 shown in Fig. 2, the cams 82 thereof are displaced 30° from the depressions 74 in the lock disk 76 in the manner shown in Fig. 4 with the result that said lock disk is held depressed. In the neutral position of the rotor shown in Fig. 2, the outer ends of its cams 72 are in alinement with the depressions 74 in the lock disk 76 in the manner shown in Fig. 4, but may not register with the same inasmuch as the cams 82 of the brush carrier hold said lock disk depressed. However, while the rotor 64 is in its neutral position and on rotating the brush carrier 42 from its neutral position (Fig. 2) in either direction through 30° into either of two active positions, the cams 82 of the brush carrier will aline with the depressions 74 in the lock disk 76 and permit the latter to yield closer toward the brush carrier and lock the same as well as the rotor against rotation by virtue of the registry of the cams 82 and 72, respectively, with the depressions 74 in said lock disk. Release of the brush carrier 42 from locking engagement with the disk 76 may be accomplished by forcibly rocking the brush carrier from either active position or by turning the rotor from its neutral position. In either case the lock disk 76 is depressed from locking engagement with the cams 72 and 82 of the rotor and the brush carrier, respectively, as will be readily understood. The brush carrier 42 is normally yieldingly urged into its neutral position by any suitable means, such as the spring means 84 (Fig. 1) which are fully shown and described in my co-pending application, Serial No. 305,637, filed November 22, 1939. However, the spring force which tends to return the brush carrier to its neutral position must be insufficient to unlock the brush carrier in either active position.

On rocking the brush carrier 42 from its neutral position through 30° clockwise as viewed in Fig. 2 for a right-turn indication, for instance, the brush 54 in the brush holder 46 engages the rotor conductor 68. When such engagement takes place, two signal circuits are closed which comprise any suitable source of electrical energy, such as a storage battery, and a suitable electrical connection (neither shown) between said battery and a terminal post 86 on the switch housing, a conductive sleeve 88 provided by said terminal post, a brush 90 which is received in the sleeve 88 and spring-urged against the rotor conductor 68, the conductor 68 itself, the brushes 54 and 56 in the conductive sleeve 52 of the brush holder 46, the conductive track 60a and the terminal 62a from which leads 92 and 94 pass to grounded light bulbs 96 and 98, respectively. The bulbs 96 and 98 may be mounted in special lamp housings on the right side, for instance, and in the rear and front, respectively, of the vehicle, and light emitted from these lamp housings will indicate a right turn. Two more bulbs 100 and 102 are mounted in similar lamp housings at the left side and in the rear and front, respectively, of the vehicle, and light emitted from these lamp housings will indicate a left turn. The signal circuits through the latter bulbs are closed in a self-evident manner on rocking the brush carrier 42 from its neutral position counterclockwise as viewed in Fig. 2. Instead of using special bulbs and special lamp housings for sending direction signals, the conventional parking light bulbs and/or stop light bulbs in the vehicle may be used for this purpose in a manner shown and described in my co-pending application, Serial No. 298,793, filed October 10, 1939.

The rotor shaft 66 carries at its front end a lever 104 which is in any suitable manner so drivingly connected with the steering mechanism of the vehicle that the rotor 64 assumes its neutral position when the vehicle proceeds in a straight direction, is turned counter-clockwise as viewed in Fig. 2 when the vehicle turns to the right, and is turned clockwise when the vehicle turns to the left. The driving connection between the rotor 64 and the steering mechanism may, for instance, be like the one shown and described in my co-pending application Serial No. 305,638, filed November 22, 1939. Thus, on rocking the brush carrier 42 clockwise as viewed in Fig. 2, for instance, for closing the right-turn signal circuits before the vehicle actually negotiates the indicated turn, the brush carrier 42 becomes locked in its corresponding active position and maintains said circuits closed. The rotor 64 is then turned from its neutral position counter-clockwise as viewed in Fig. 2 as soon as the vehicle starts to negotiate the right turn, with the result that the brush carrier 42 is released from locking engagement with the disk 76 and spring-returned to its neutral position. However, the return of the brush carrier 42 to its neutral position does not result in opening of the right-turn signal circuits because the rotor 64 has in the meantime been sufficiently rotated counter-clockwise as viewed in Fig. 2 that the rotor conductor 68 remains in engagement with the brush 54 in the holder 46. The steering mechanism of the vehicle will return the rotor 64 to its neutral position when the vehicle assumes its straight direction of movement after negotiating the right turn, and the right turn signal circuits will be opened shortly before the rotor arrives in its neutral position. It will now be understood that once the switch is manually set for a left or right-turn indication, the corresponding signal circuits will remain closed until the rotor 64 returns to neutral position, i. e., until the vehicle has substantially negotiated the indicated turn.

The switch housing 24 may be mounted on a bracket 106 which is preferably secured to the steering gear housing of the vehicle in a manner shown and described in my previously mentioned co-pending application, Serial No. 305,638. To manually operate the brush carrier, a lever 108 on the brush carrier sleeve 38 (Fig. 1) is preferably connected with a switch actuator shaft which passes upwardly through the steering gear housing and is suitably journalled in a hollow steering shaft that carries the steering wheel at its upper end, all as shown and described in my said copending application Serial No. 305,638. The upper end of the switch actuator shaft may have a manual actuator at the hub of the steering wheel as shown and described in my co-pending application, Serial No. 298,794 filed October 10, 1939.

The switch herein described is structurally similar to the switch shown and described in my mentioned co-pending application, Serial No. 305,637, and operates like the switch shown in my prior Patent No. 1,910,869, May 23, 1933.

The vacuum flasher 22, which is embodied in a unit with the direction signal switch 20, comprises in the present instance a rigid metallic end member 110 and a flexible diaphragm 112 of any suitable material which are permanently secured to one end of the housing cover 26 by means of a retainer ring 114. The end member 110 and the diaphragm 112 together form a contractible and expansible operating chamber 116 for the flasher. Secured by a nut 118 or the like to the end member 110 is a fitting 120 providing two opposed valve seats 122 and 124 and a passage 126 which is in permanent communication with a conduit 128, suitably secured to the member 120 by a union 130. The conduit 128 is in communication with a partial vacuum such as in the intake manifold, for instance, of the internal combustion engine of the vehicle. Suitably secured at 132 to the diphragm 112 is a sleeve-like valve 134 which becomes seated on the valve seat 122 on each contraction of the operating chamber 116. A compression spring 136 tends to expand the operating chamber 116 as shown in Fig. 1. Axially slidable in the valve 134 is a main shut-off valve 138 which may be lifted from, and seated on, the valve seat 124 in a manner to be described presently. The free end of the valve 138 is suitably secured at 140 to a dish-shaped plate 142 which is held non-rotatable and is guided for movement axially of the rotor and brush carrier by guide pins 144 (Figs. 1 and 3) which projects from the end cover 30 of the switch housing. Compression springs 146, surrounding the guide pins 144, urge the plate 142 toward the rotor 64 and the brush carrier 42. Provided in the depressed bottom 145 of the plate 142 are clearance holes 147 (Figs. 3, 4 and 5) for the springs 80 which urge the lock discs 76 against the rotor and brush carrier. As best shown in Fig. 4, the plate 142 has in a raised outer flange 148 four depressions 150 which aline with the outer ends of cams 82 of the brush carrier when the latter is in its neutral position. The plate 142 has in a raised central portion 152 three more depressions 154 which aline with the inner ends of the cams 72 on the rotor when the latter is in its neutral position. When both the brush carrier 42 and the rotor 64 are in their neutral position (Fig. 2), the cams 82 and 72 thereof not only aline but also register with the depressions 150 and 154, respectively, in the plate 142, with the result that the latter is then so close to the rotor and the brush carrier that the valve 138 is seated on the valve seat 124 and closes the vacuum passage 126. However, on manually setting the switch for a direction indication, the cams 82 on the brush carrier disaline from the depressions 150 in the plate 142 and depress the latter to the right as viewed in Fig. 1, with the result that the valve 138 is lifted from its seat 124. The spring return of the brush carrier 42 into its neutral position after the rotor 64 is rotated from its neutral position by the steering mechanism does not result in re-registry of the brush carrier cams 82 with the depressions 150 in the plate 142 because the rotor cams 72 have in the meantime been disalined from the depressions 154 in said plate and hold the latter depressed until the rotor returns to its neutral position, as will be readily understood. Hence, as long as either the brush carrier 42 or the rotor 64 is out of its neutral position, the valve 138 is lifted from its seat 124 and permits communication between the vacuum conduit 128 and the operating chamber 116 of the flasher. While the valve 138 is open, the expanded operating chamber 116 is contracted by the partial vacuum. The contraction of the chamber 116 is caused by an inward bending of the diaphragm 112 until the valve 134 becomes seated on the valve seat 122, whereupon atmospheric air entering the chamber 116 through a vent hole 156 is aided by the spring 136 to cause quick expansion of the chamber 116 and relifting of the valve 134 from its seat 132 until the admitted partial vacuum again contracts the chamber 116 and the valve 134 is again seated on its seat 122. Thus, alternate expansion and contraction of the operating chamber 116 takes place as long at the main valve 138 is open. When the main valve 138 is closed, the air admitted to the chamber 116 through the vent hole 156 brings said chamber back into its normal expanded state. Mounted on the outside of the switch housing is a main terminal (not shown) which is connected with any suitable source of electrical energy such as a storage battery (not shown). Secured at 158 to the main terminal is a conductive leaf spring 160 which has intermediate its ends two punched-out lugs 162 to which is pivoted at 164 a link 166 which is preferably of insulating material and is connected at 168 with the diaphragm 112 at a place remote from the outer periphery thereof. The free end of the conductive leaf spring 160 is adapted to alternately engage the inwardly bent tongues 170 of a conductive strap 172 when the operating chamber 116 expands and contracts. The conductive strap 172 lies preferably in a machined groove 174 in the housing cover 26 and is in contact with the conductive sleeve 88 in the manner best shown in Fig. 1. Thus, as long as the left turn or right turn signal circuits are closed, i. e., as long as the brush carrier 42 or the rotor 64 is out of its neutral position, the vacuum flasher is operative and the current flow in the closed signal circuits is periodically interrupted, resulting in periodic lighting of the respective bulbs.

The switch described herein in connection with the vacuum flasher is a preferred one, and it is to be understood that the present invention is not intended to be limited to this particular switch as other switches may be combined in a single unit with the vacuum flasher without departing from the scope of the present invention. For instance, the switch shown and described in my mentioned co-pending application Serial No. 305,637 can be combined with the present vacuum flasher in a single contained unit in a self-evident manner.

I claim:

1. The combination with a switch having two movable members for closing different electrical circuits on movement of either member from a neutral position in opposite directions, respectively, and each member having a cam, of a flasher having make-and-break contacts in said circuits and a contractible and normally expanded, vented chamber for causing, on contraction and expansion, engagement and disengagement of said contacts, said chamber having a port providing communication between the former and a partial vacuum and a first valve closing said port on each contraction of said chamber; another valve; a plate spring-urged against said members which are immovable in the direction of movement of the plate, and said plate having depressions registering with said cams when the respective members are in neutral position; and a driving connection between said plate and other valve such that the latter closes said port independently of said first valve when the cams of both members register with said depressions.

2. The combination as set forth in claim 1, in which said switch has a closed housing enclosing the switch members and said plate, and having said port in one end, said chamber is formed in said housing by a flexible partition therein opposite said port, said first valve is sleeve-like and secured to said partition and extends through the latter, and said other valve is slidably fitted in said first valve.

3. The combination with a switch having two movable members for closing different electrical circuits, respectively, on movement of either member from a neutral position in opposite directions, respectively, one member being normally urged into neutral position and each member having two cams, of a flasher having make-and-break contacts in said circuits and a contractible and normally expanded, vented chamber for causing, on contraction and expansion, engagement and disengagement of said contacts, said chamber having a port providing communication between the former and a partial vacuum and a first valve closing said port on each contraction of said chamber; two plates spring-urged against said members which are immovable in the direction of the former, one plate having depressions being in the path of movement of one cam of each member, respectively, and registering with the same in either of two active positions of said one member opposite its neutral position and in the neutral position of the other member, respectively, to thereby lock said one member against return to its neutral position and to release the latter for such return on movement of the other member from its neutral position, and the other plate having depressions being in the path of movement of the other cams of the members, respectively, and registering with the same in the neutral position of said members, respectively; another valve; and a driving connection between said other plate and other valve such that the latter closes said port independently of said first valve in the neutral position of both members only.

4. The combination as set forth in claim 3, in which said members are rotatable coaxially of each other and otherwise immovable, said switch has a closed housing enclosing the switch members and said plates and having said port in one end, said chamber is formed in said housing by a flexible partition therein opposite said port, said first valve is sleeve-like and secured to said partition and extends through the latter, and said other valve is slidably fitted in said first valve and directly connected with said other plate.

5. A combined switch and flasher unit, comprising a rigid housing; a flexible diaphragm in said housing partitioning the same in two chambers of which one has a port with two tandem-arranged valve seats opposite said diaphragm and a vent; cooperating switch elements in the other chamber for opening and closing a circuit; a first valve in said one chamber movable with the flexing diaphragm into and from seating engagement with one of said valve seats; another valve; means causing said other valve to become seated on and lifted from the other valve seat on actuating said switch elements to open and close, respectively, said circuit; and make-and-break contacts in said circuit actuated by the flexing diaphragm when said other valve is unseated and said first valve establishes periodic communication between said one chamber and a partial vacuum through said port.

6. A combined switch and flasher unit as set forth in claim 5, in which said diaphragm has an aperture opposite said port and said first valve is sleeve-like and mounted in said aperture, said other valve is slidable in said first valve and said means are located in said other chamber.

7. A combined switch and flasher unit as set forth in claim 5, in which said diaphragm has an aperture opposite said port and said first valve is sleeve-like and mounted in said aperture, said other valve is slidable in said first valve and said means as well as said make-and-break contacts are located in said other chamber.

8. A combined switch and flasher unit as set forth in claim 5, in which said valve seats are provided on the opposite ends of said port and said diaphragm has an aperture opposite said port, said first valve is sleeve-like and mounted in said aperture and said other valve is slidable in said first valve and said means are located in said other chamber.

9. A combined switch and flasher unit, comprising a rigid housing; a centrally apertured flexible diaphragm in said housing partitioning the same in two chambers of which one has a port with two tandem-arranged valve seats opposite said aperture and a vent; cooperating switch elements in the other chamber and including a movable actuator for opening and closing a circuit; a first sleeve-like valve in said one chamber and mounted in said diaphragm aperture so as to be movable with the flexing diaphragm into and from seating engagement with one of said valve seats; another valve slidable in said first valve; means in said other chamber and including a cam on said actuator for causing said other valve to become seated on and lifted from the other valve seat on actuating said switch elements to open and close, respectively, said circuit; and make-and-break contacts in said circuit actuated by the flexing diaphragm when said other valve is unseated and said first valve establishes periodic communication between said one chamber and a partial vacuum through said port.

10. A combined switch and flasher unit, comprising a rigid housing; a centrally apertured flexible diaphragm in said housing partitioning the same in two chambers of which one has a port with two tandem-arranged valve seats opposite said aperture and a vent; two movable devices in the other chamber cooperating to close different electrical circuits on movement of either device from a neutral position in opposite directions, respectively; a first sleeve-like valve in said one chamber and mounted in said diaphragm aperture so as to be movable with the flexing diaphragm into and from seating engagement with one of said valve seats; another valve slidable in said first valve; means in said other chamber and including a cam on each device for causing said other valve to become seated on and lifted from the other valve seat on movement of either device into, respectively, from neutral position; and make-and-break contacts in said circuits actuated by the flexing diaphragm when said other valve is unseated and said first valve establishes periodic communication between said one chamber and a partial vacuum through said port.

11. A vacuum flasher comprising a casing having a vent, one wall of said casing being formed by a flexible diaphragm and the wall opposite thereof being provided with a port communicable with a partial vacuum and having two tandem-arranged valve seats of which one is at the inner end of said port, a valve in said casing carried by said diaphragm and becoming seated on said one valve seat every time a partial vacuum in said casing causes the diaphragm to flex inwardly, another valve movable into and from seating engagement with the other valve seat, and make-and-break contacts actuated by the flexing diaphragm.

12. A vacuum flasher comprising a casing having a vent, one wall of said casing being formed by a centrally apertured, flexible diaphragm and the wall opposite thereof being provided with a port communicable with a partial vacuum and having two tandem-arranged valve seats of which one is at the inner end of said port, a first sleeve-like valve in said casing mounted in the diaphragm aperture and becoming seated on said one valve seat every time a partial vacuum in said casing causes the diaphragm to flex inwardly, another valve slidable in said first valve and movable into and from seating engagement with the other valve seat, and make-and-break contacts actuated by the flexing diaphragm.

PAUL WEIEN.